United States Patent
Han (10) Patent No.: US 10,044,019 B2
(45) Date of Patent: Aug. 7, 2018

(54) BATTERY MODULE HAVING SHORT-CIRCUIT CONNECTION MEMBER

(71) Applicant: SAMSUNG SDI CO., LTD., Yongin-si, Gyeonggi-do (KR)

(72) Inventor: Min-Yeol Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 251 days.

(21) Appl. No.: 14/295,181

(22) Filed: Jun. 3, 2014

(65) Prior Publication Data

US 2015/0207131 A1 Jul. 23, 2015

(30) Foreign Application Priority Data

Jan. 20, 2014 (KR) .................. 10-2014-0006940

(51) Int. Cl.
*H01M 2/00* (2006.01)
*H01M 2/34* (2006.01)
*H01M 2/10* (2006.01)
*H01M 2/20* (2006.01)

(52) U.S. Cl.
CPC ......... *H01M 2/345* (2013.01); *H01M 2/1061* (2013.01); *H01M 2/1077* (2013.01); *H01M 2/202* (2013.01); *H01M 2200/103* (2013.01); *H01M 2200/20* (2013.01)

(58) Field of Classification Search
CPC .............. H01M 2/345; H01M 2/1252; H01M 2200/105; H01M 2/202; H01M 2200/20; H01M 2200/103
See application file for complete search history.

(56) References Cited

U.S. PATENT DOCUMENTS

| | | | |
|---|---|---|---|
| 6,002,240 A | * | 12/1999 | McMahan ......... H01M 10/4257 320/150 |
| 8,338,021 B2 | | 12/2012 | Cheon et al. |
| 2009/0176146 A1 | * | 7/2009 | Matsuura .............. H01M 10/48 429/90 |
| 2010/0279156 A1 | | 11/2010 | Kim et al. |

(Continued)

FOREIGN PATENT DOCUMENTS

| KR | 10-2011-0005197 | 1/2011 |
|---|---|---|
| KR | 10-2011-0017778 | 2/2011 |

*Primary Examiner* — Nicholas P D'Aniello
*Assistant Examiner* — Jennifer A Moss
(74) *Attorney, Agent, or Firm* — Lewis Roca Rothgerber Christie LLP (57) ABSTRACT

A battery module of the present invention includes a plurality of rechargeable batteries, each rechargeable battery having a first terminal and a second terminal, a bus bar having a first connection member and a second connection member, the first connection member being coupled to the bus bar via a serial connection member and a short-circuit connection member, and the second connection member being coupled to the bus bar via a fuse portion, and a short-circuit member connected to the first connection member through a serial connection member and connected to the second connection member through a fuse portion. The short-circuit member may be configured to be deformed by increased internal pressure in the respective rechargeable battery to couple to the short-circuit connection member.

13 Claims, 9 Drawing Sheets

(56) References Cited

U.S. PATENT DOCUMENTS

| | | | | |
|---|---|---|---|---|
| 2011/0039147 A1* | 2/2011 | Cheon | ............... | H01M 2/206 |
| | | | | 429/159 |
| 2012/0214030 A1* | 8/2012 | Guen | ............... | H01M 2/0404 |
| | | | | 429/61 |
| 2012/0214034 A1* | 8/2012 | Minokawa | ............ | H01M 2/1077 |
| | | | | 429/83 |
| 2012/0225333 A1* | 9/2012 | Kim | ............... | H01M 2/021 |
| | | | | 429/61 |
| 2012/0315532 A1* | 12/2012 | Andersen | ............ | H01M 2/20 |
| | | | | 429/175 |
| 2013/0011703 A1* | 1/2013 | Kim | ............... | H01M 2/30 |
| | | | | 429/61 |
| 2013/0252038 A1* | 9/2013 | Kim | ............... | H01M 2/1077 |
| | | | | 429/61 |

* cited by examiner

BATTERY MODULE HAVING SHORT-CIRCUIT CONNECTION MEMBER

CROSS-REFERENCE TO RELATED APPLICATION

This application claims priority to and the benefit of Korean Patent Application No. 10-2014-0006940 filed in the Korean Intellectual Property Office on Jan. 20, 2014, the entire contents of which are incorporated herein by reference.

BACKGROUND

1. Field

Aspects of the present invention relate to a battery module.

2. Description of the Related Art

A rechargeable battery differs from a primary battery in that it can be repeatedly recharged and discharged, while a primary battery is incapable of being recharged. Low-capacity rechargeable batteries may be used in small portable electronic devices such as mobile phones, notebook computers, and camcorders, while high-capacity rechargeable batteries may be used as a power source for driving the motor of a hybrid vehicle or an electric vehicle.

Rechargeable batteries may be used in small electronic devices such as single cell batteries or motor-driving power sources, etc., such as battery modules in which a plurality of cells may be electrically connected. A rechargeable battery module may connect electrode terminals of unit cells in series or parallel with a bus bar.

When internal pressures within a rechargeable battery, of which a case may be made of metal, etc., increase by an abnormal reaction, for example, the rechargeable battery may explode or catch fire. Further, when rechargeable batteries are connected in parallel and a short-circuit occurs, the short-circuit current may be distributed to the rechargeable batteries connected in parallel, thereby triggering a chain reaction.

SUMMARY

Aspects of the present invention relate to a battery module having improved safety features during the occurrence of a short-circuit. More particularly, aspects of the present invention relate to a battery module with improved safety features when the battery case experiences increased internal pressures.

A battery module, according to an embodiment of the present invention, may include a plurality of rechargeable batteries, each rechargeable battery having a first terminal and a second terminal, a bus bar including a first connection member and a second connection member, the first connection member being coupled to the bus bar via a serial connection member and a short-circuit connection member and the second connection member being coupled to the bus bar via a fuse portion, and a short-circuit member connected to the first connection member through a serial connection member and connected to the second connection member through a fuse portion. The short-circuit member may be configured to be deformed by increased internal pressure in the respective rechargeable battery to couple to the short-circuit connection member.

The short-circuit connection member and the second connection member may be coupled to the same rechargeable batteries of the plurality of rechargeable batteries, and the short-circuit connection member and the first connection member may be respectively coupled to different rechargeable batteries of the plurality of rechargeable batteries.

Each short-circuit connection member may be rectangular-shaped, the first connection member may be coupled to the short-circuit connection member along a length of the short-circuit connection member, and the second connection member may be coupled to the short-circuit connection member along a width of the short-circuit connection member.

Each rechargeable battery of the plurality of rechargeable batteries may further include an electrode assembly having a positive electrode and a negative electrode, a case accommodating the electrode assembly, and a cap assembly coupled to the case, the cap assembly having a cap plate. The cap plate and the first terminal may be electrically coupled to the positive electrode and the second terminal may be electrically coupled to the negative electrode.

The short-circuit connection member may further include a short-circuit protrusion extending toward the short-circuit member.

The cap plate may define a short-circuit opening through which the short-circuit member may be inserted.

The short-circuit connection member may be thicker than the second connection member.

The first connection member, the serial connection member, and the short-circuit connection member may be arranged in series.

The first connection member, the serial connection member, and the short-circuit connection member may be integrally formed.

An upper insulating member may be between the short-circuit member and the short-circuit connection member, and an opening coupled to the short-circuit opening may be defined in the upper insulating member.

The cap plate may be plate-shaped, and the second terminal may be positioned closer to a center of the cap plate than to the short-circuit member.

The short-circuit member of each rechargeable battery may include a drawn-out tab at one end of the plurality of rechargeable batteries, and the drawn-out tab may be coupled to the second connection member at the fuse portion.

Each rechargeable battery of the plurality of rechargeable batteries may further include an insulating cover extending over the second connection member and the fuse portion.

The insulating cover may further extend over the short-circuit connection member.

In a battery module according to an embodiment, the first connection member is connected to the short-circuit connection member and the second connection member is connected to the short-circuit connection member through the fuse portion, and the fuse portion may be melted to electrically cut off the first and second connection members such that a short-circuited rechargeable battery can be electrically isolated from the battery module.

DETAILED DESCRIPTION

The present invention will be described in more detail hereinafter with reference to the accompanying drawings, in which various embodiments of the invention are shown.

As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Figure 1:
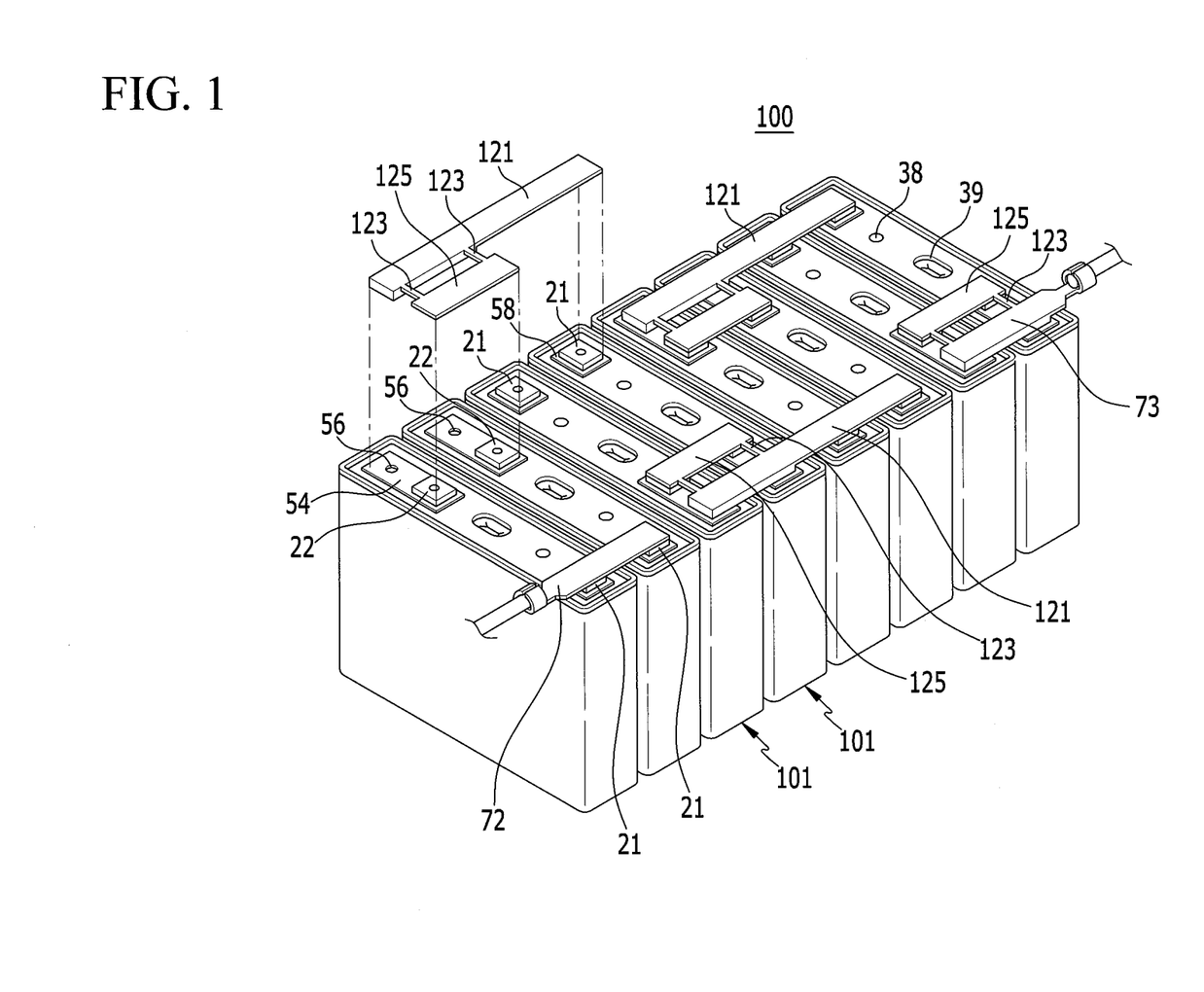
FIG. 1 is a perspective view of a battery module according to a first embodiment of the present invention.

FIG. 1 is a perspective view of a battery module according to a first embodiment of the present invention. Referring to FIG. 1, the battery module 100 according to this first embodiment includes a first parallel connection portion, a second parallel connection portion, and a serial connection portion that electrically connect a plurality of rechargeable batteries 101.

The plurality of rechargeable batteries 101, in an embodiment, are stacked such that two rechargeable batteries 101 are connected in parallel, and this pair of rechargeable batteries 101 connected in parallel are then connected in series with another pair of rechargeable batteries 101 connected in parallel.

An embodiment with a 2P4S (or two connected in parallel connected in series with two connected in parallel) structure for the rechargeable batteries 101 is illustrated in FIG. 1, but the present invention is not limited thereto, and may include various structures, for example, a 3P10S structure.

In an embodiment, in order to draw out a current, a first drawn-out tab 72 may be coupled to first terminals 21 at one lateral end of the stacked rechargeable batteries 101, while a second drawn-out tab 73 may be coupled to short-circuit members 56 at the opposite lateral end of the stacked rechargeable batteries 101.

The first drawn-out tab 72, according to an embodiment, may be coupled to two first terminals 21, and the second drawn-out tab 73 may be on two short-circuit members 56 of the rechargeable batteries 101.

The second drawn-out tab 73, according to an embodiment, may be electrically connected to a second connection member 125 through a fuse portion 123 described in greater detail, below.

The first and second drawn-out tabs 72 and 73, according to an embodiment, may be connected to a module terminal so as to transmit the current to a device in which the battery module 100 is installed.

Figure 2:
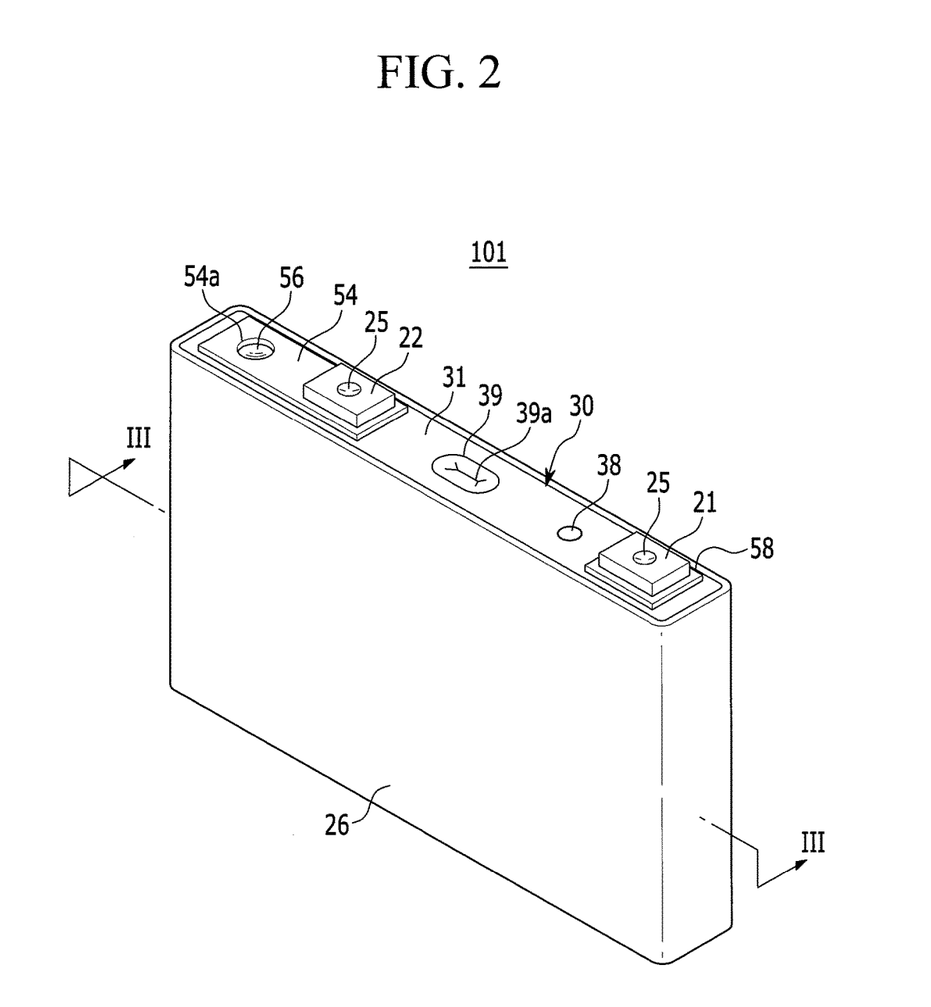
FIG. 2 is a perspective view of a rechargeable battery according to the first embodiment of the present invention.
Figure 3:
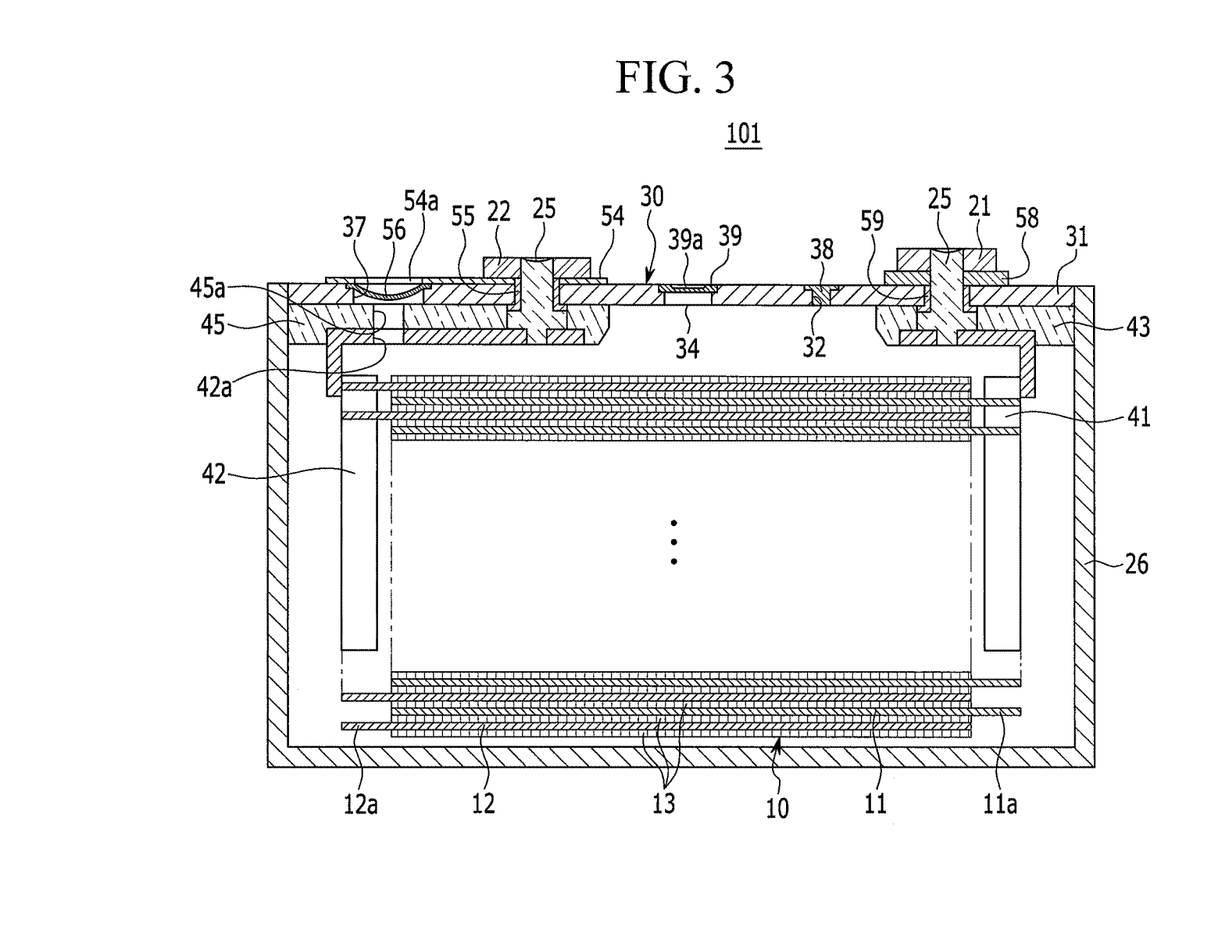
FIG. 3 is a cross-sectional view of the rechargeable battery of FIG. 2 taken along the line III-III.

FIG. 2 is a perspective view of the rechargeable battery according to the first embodiment of the present invention, and FIG. 3 is a cross-sectional view of the rechargeable battery of FIG. 2 taken along the line III-III.

Referring to FIGS. 2 and 3, the rechargeable battery 101 according to these embodiments includes an electrode assembly 10 formed, for example, by winding a positive electrode (first electrode) 11 and a negative electrode (second electrode) 12 with a separator 13 interposed therebetween, a case 26 accommodating the electrode assembly 10, and a cap assembly 30 coupled to the case 26.

The rechargeable battery 101 according to this embodiment is illustrated as a prism-shaped lithium ion rechargeable battery 101 in FIGS. 2 and 3. However, embodiments of the present invention are not limited thereto, and the rechargeable battery 101 may be of a variety of types of batteries, for example, a lithium polymer battery or a cylindrical battery, etc.

In an embodiment, the positive electrode 11 and the negative electrode 12 may include coated regions where an active material is coated on a current collector formed of a thin metal foil, for example, and positive and negative uncoated regions 11a and 12a where the active material is not coated thereon.

In an embodiment, the positive electrode uncoated region 11a may be at one lateral end of the positive electrode 11 along its length, and the negative electrode uncoated region 12a may be at the opposite lateral end of the negative electrode 12 along its length.

In an embodiment, the positive electrode 11 and the negative electrode 12 are wound with the separator 13 therebetween, the separator 13 operating as an insulator, between the positive electrode 11 and the negative electrode 12.

However, embodiments of the present invention are not limited thereto, and, in an embodiment, the electrode assembly 10 may be formed in a layered structure in which a negative electrode 12 and a positive electrode 11, respectively formed of a plurality of sheets, may be layered with a separator 13 between the layers.

The case 26, according to an embodiment, is substantially cuboid, and may have an opening at one side. The case 26, according to an embodiment, may be made of a metal such as aluminum, stainless steel, etc.

The cap assembly 30, according to an embodiment, includes a cap plate 31 extending over the opening of the case 26, a first terminal 21 electrically connected to the positive electrode 11 and protruding out of the cap plate 31, and a second terminal 22 electrically connected to the negative electrode 12 and protruding out of the cap plate 31.

The cap plate 31, according to an embodiment, may have an elongated plate shape in one direction, and may be coupled to the case 26 at its opening.

According to an embodiment, the rechargeable battery 101 may include a sealing cap 38 in an electrolyte injection opening 32 in the cap plate 31, and a vent plate 39 with a notch 39a in a vent 34 of the cap plate 31 configured to be opened at a predetermined pressure.

In an embodiment, the first and second terminals 21 and 22 may protrude above the cap plate 31.

In an embodiment, the first terminal 21 may be electrically connected to the positive electrode 11 through a first current collecting member 41, and the second terminal 22 may be electrically connected to the negative electrode 12 through a second current collecting member 42. However, embodiments of the present invention are not limited thereto, and the first terminal 21 may be electrically connected to the negative electrode 12, while the second terminal 22 may be electrically connected to the positive electrode 11.

In an embodiment, the first terminal 21 has a rectangular plate shape.

In an embodiment, the first terminal 21 may be electrically connected to the positive electrode 11 through a connecting terminal 25 that is coupled to the first current collecting member 41.

In an embodiment, the connecting terminal 25 coupled to the first terminal 21 has the same structure as the connecting terminal 25 coupled to the second terminal 22.

In an embodiment, a sealing gasket 59 for sealing may be between the first terminal 21 and the cap plate 31 inserted into an opening through which the connecting terminal 25 penetrates the cap plate 31, and a first lower insulating member 43 may be positioned under the cap plate 31 to support the first terminal 21 and the first current collecting member 41.

In an embodiment, a cap connection member 58 is positioned under the first terminal 21 to electrically connect the first terminal 21 and the cap plate 31. In this embodiment, the cap plate 31 and the case 26 are positively charged.

In an embodiment, the second terminal 22 has a rectangular plate shape.

In an embodiment, the second terminal 22 may be electrically connected to the negative electrode 12 through the connecting terminal 25 that is coupled to the second current collecting member 42.

In an embodiment, the connecting terminal 25 may penetrate through the cap plate 31 and the second terminal 22 such that an upper part of the connecting terminal 25 may be coupled to the second terminal 22.

In an embodiment, a sealing gasket 55 for sealing may be between the second terminal 22 and the cap plate 31 inserted into an opening through which the connecting terminal 25 penetrates the cap plate 31, and a second lower insulating member 45 may be positioned under the cap plate 31 to support the second terminal 22 and the second current collecting member 42.

In an embodiment, an upper insulating member 54 may be positioned between the second terminal 22 and the cap plate 31 to provide insulation.

In an embodiment, the upper insulating member 54 may extend over to a short-circuit opening 37, and an opening 54a may be positioned above the short-circuit opening 37 such that it is connected thereto.

In this embodiment, since the cap assembly 30 includes a short-circuit member 56 that may be configured short-circuit the positive and negative electrodes 11 and 12, the short-circuit member 56 may be electrically connected to the cap plate 31 and may be deformed to cause a short-circuit when the internal pressure of the rechargeable battery 101 increases.

In an embodiment, the short-circuit opening 37 may be in the cap plate 31, and the short-circuit member 56 may be positioned between the upper insulating member 54 and the cap plate 31 at the short-circuit opening 37.

In an embodiment, the short-circuit member 56 may include a curved portion with a downwardly convex arc shape, and an edge portion at its end portions to be fixed to the cap plate 31.

In an embodiment, the short-circuit member 56 may be positioned below the opening 54a.

The short-circuit member 56, in an embodiment, may be positioned closer to one lateral side of the case 26 than the second terminal 22.

In an embodiment, the cap plate 31 may have an elongated plate shape, and may be positioned closer to a longitudinal center of the cap plate 31 than the short-circuit member 56.

In an embodiment, the second lower insulating member 45 may have an exhaust opening 45a that is connected to the short-circuit opening 37, and the second current collecting member 42 may have a fuse opening 42a that is connected to the short-circuit opening 37.

In an embodiment, a part connected to lateral ends of the fuse opening 42a may cut off the current when an overcurrent flows because the fuse opening 42a has a smaller cross-sectional area than the other parts.

As described above, according to an embodiment, since the exhaust opening 45a and the fuse opening 42a are connected to the short-circuit opening 37, an increased internal pressure of the rechargeable battery 101 may be delivered to the short-circuit member 56 such that the short-circuit member 56 can be inversely deformed at a predetermined pressure.

Figure 4:
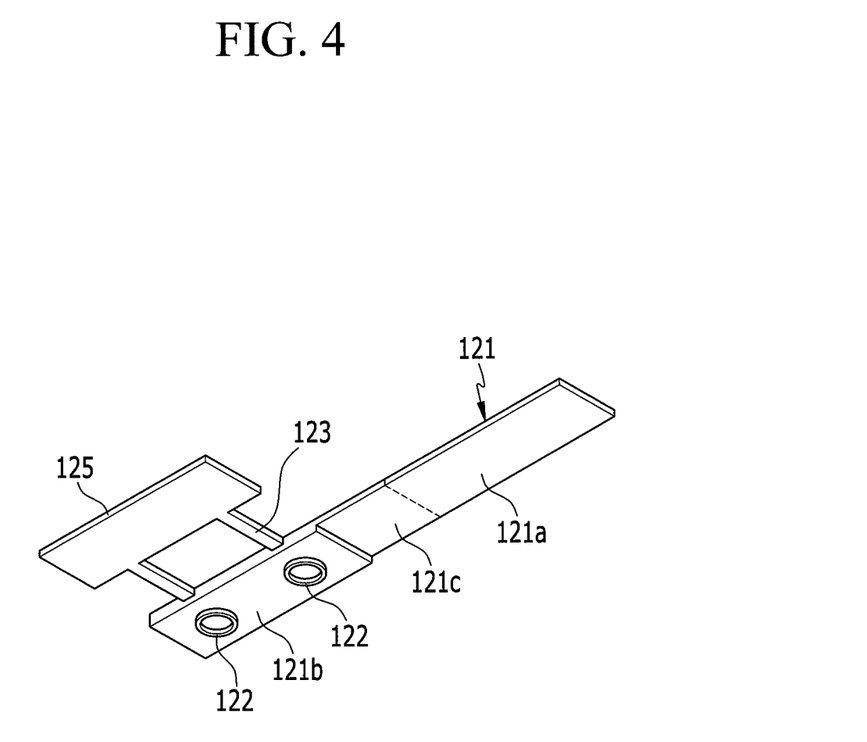
FIG. 4 is a perspective view of a first connection member, a second connection member, and a short-circuit connection member according to the first embodiment of the present invention.
Figure 5:
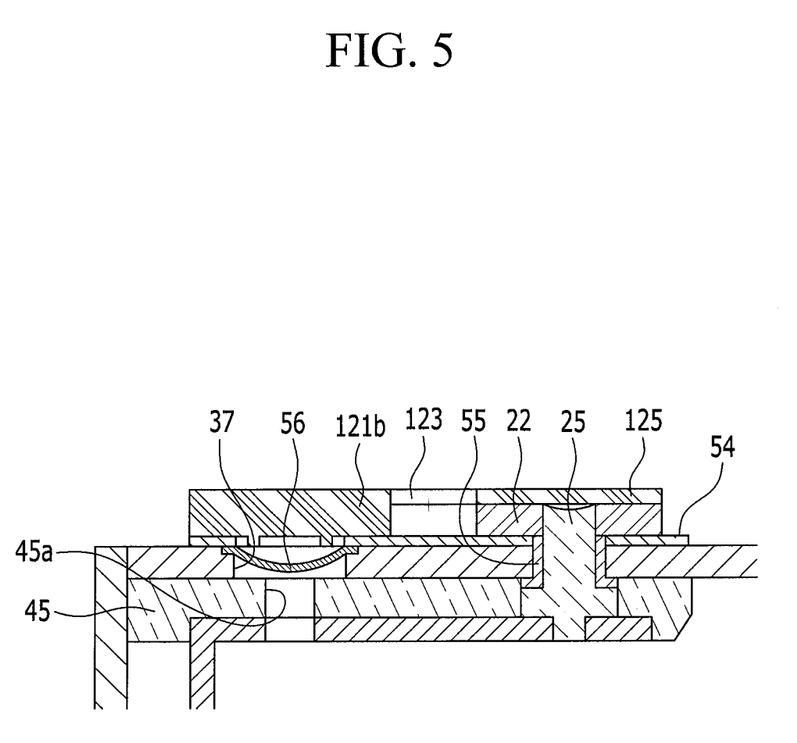
FIG. 5 is a partial cross-sectional view of the rechargeable battery showing the short-circuit connection member and the second connection member according to the first embodiment of the present invention.

FIG. 4 is a perspective view of a first connection member, a second connection member, and a short-circuit connection member according to the first embodiment of the present invention, and FIG. 5 is a partial cross-sectional view of the rechargeable battery showing the short-circuit connection member and the second connection member according to the first embodiment of the present invention.

Referring to the embodiments in FIGS. 1, 4, and 5, the rechargeable batteries 101 may be connected via the first connection member 121a and the second connection member 125.

Further, in an embodiment, the rechargeable batteries 101 connected in parallel may be connected in series by a serial connection member 121c.

A bus bar 121, according to an embodiment, includes the first connection member 121a that may be coupled to the neighboring positive terminals, a short-circuit connection member 121b that may be on the short-circuit member 56 of the neighboring rechargeable battery 101, and the serial connection member 121c for interconnecting the short-circuit connection member 121b and the first connection member 121a.

In an embodiment, the bus bar 121 may have an elongated plate shape, and the first connection member 121a, the short-circuit connection member 121b, and the serial connection member 121c may be integrally formed.

In an embodiment, the first connection member 121a is bonded to two neighboring first terminals 21, for example, by welding.

The short-circuit connection member 121b, in an embodiment, may be on the short-circuit member 56, and the short-circuit connection member 121b may include a short-circuit protrusion 122 protruding toward the short-circuit member 56.

In an embodiment, the short-circuit protrusion 122 may have a circular diagonal cross-section.

In an embodiment, the short-circuit connection member 121b may be thicker than the first connection member 121a.

In an embodiment, the short-circuit connection member 121b and the first connection member 121a may be arranged in series such that they are respectively combined to different rechargeable batteries 101.

In an embodiment, the first connection member 121a may be electrically connected to the short-circuit connection member 121b by the serial connection member 121c such that the rechargeable batteries 101 with the short-circuit connection member 121b are connected to the rechargeable batteries 101 with the first connection member 121a.

In an embodiment, the second connection member 125 may be connected to the short-circuit connection member 121b through the fuse portion 123.

In an embodiment, the short-circuit connection member 121b may be elongated in one direction such that it has a rectangular plate shape in length and width.

The first connection member 121a, according to an embodiment, may be connected to the short-circuit connection member 121b along the length of the short-circuit connection member 121b, and the second connection member 125 may be connected to the short-circuit connection member 121b along its width. Accordingly, in this embodiment, the first connection member 121a and the second connection member 125 may be connected to the short-circuit connection member 121b in perpendicularly crossing directions with respect to each other.

Two fuse portions 123 may be positioned between the second connection member 125 and the short-circuit connection member 121b, according to an embodiment, and each fuse portion 123 may have a smaller cross-sectional area such that it may be melted down to cut off the flow of current when an overcurrent like a short-circuit current flows.

In this embodiment, when a plurality of fuse portions 123 are positioned between the second connection member 125 and the short-circuit connection member 121b, the short-circuit current may be distributed to prevent or decrease arc generation if the fuse portions 123 are melted.

The second connection member 125, according to an embodiment, may be coupled to the neighboring second terminals 22 such that it electrically connects the second terminals 22. Thus, in this embodiment, the short-circuit connection member 121b may be electrically connected to the second terminals 22 through the second connection member 125.

In an embodiment, the arc-like shape of the short-circuit member 56 may be inversely deformed when the internal pressure of any one of the rechargeable batteries 101 increases. Thus, in this embodiment, the short-circuit member 56 may contact the short-circuit connection member 121b positioned thereon.

In an embodiment, the short-circuit member 56 may be connected to the positive electrode 11 and the short-circuit connection member 121b may be connected to the negative electrode 12, and a short-circuit may occur due to contact between the short-circuit member 56 and the short-circuit connection member 121b. Thus, in this embodiment, the short-circuit current, which is several tens of times greater than a rated current, flows, and the fuse portion 123 may be melted to cut off the current.

In order for the fuse portion 123 to be melted, a melting temperature of the fuse portion 123 is set lower than that of the short-circuit member 56.

As described above, according to the present exemplary embodiment, since the short-circuit connection member 121b of the bus bar 121 is disposed to be able to contact the short-circuit member 56 and the fuse portion 123 is provided between the second connection member 125 and the short-circuit connection member 121b, the current may be easily cut off when the short-circuit occurs.

Figure 6:
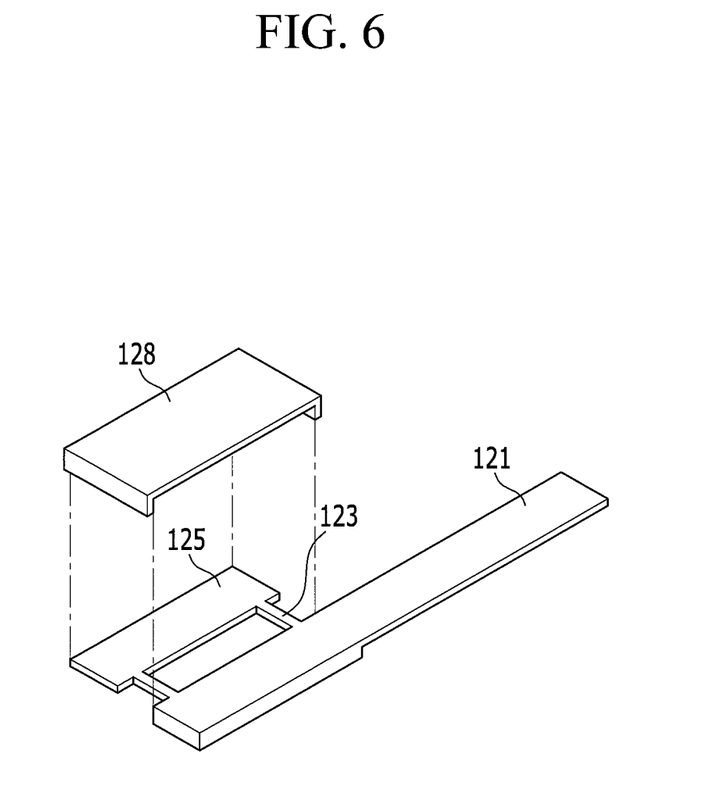
FIG. 6 is an exploded perspective view of a bus bar, a second connection member, and an insulating cover according to a second embodiment of the present invention.
Figure 7:
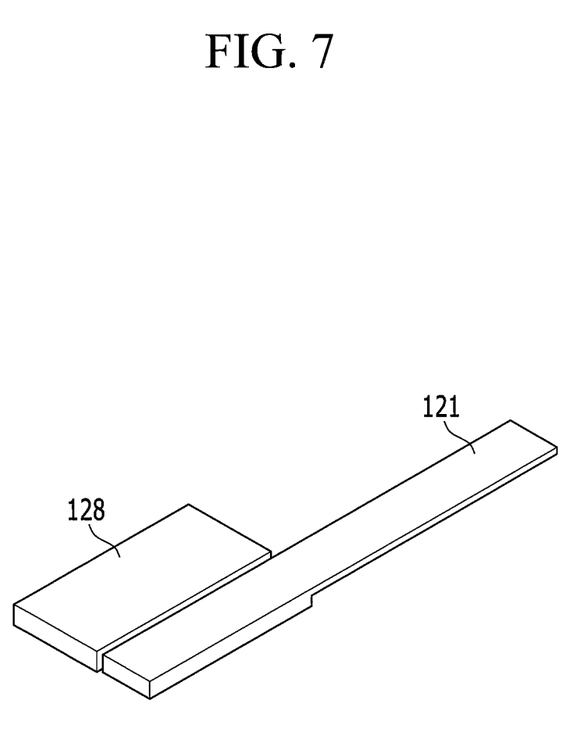
FIG. 7 is a perspective view showing the bus bar, the second connection member, and the insulating cover illustrated in FIG. 6 combined together.

FIG. 6 is an exploded perspective view of a bus bar, a second connection member, and an insulating cover according to a second embodiment of the present invention, and FIG. 7 is a perspective view showing the bus bar, the second connection member, and the insulating cover illustrated in FIG. 6 combined together.

Referring to FIGS. 6 and 7, a battery module according to these embodiments has the same structure as the battery module 100 according to the first embodiment, except for an insulating cover 128, thus a repeated description of the same structure is omitted.

In an embodiment, the insulating cover 128 may cover the second connection member 125 and the fuse portion 123.

In an embodiment, the insulating cover 128 may help prevent the second connection member 125 and the fuse portion 123 from fracturing, and may block heat dissipation from the fuse portion 123 such that the fuse portion 123 may be more precisely melted at a predetermined temperature. Further, when the fuse portion 123 is melted, according to an embodiment, the insulating cover 128 may prevent an arc and its residues from scattering. Thus, even if an arc is generated due to melting of the fuse portion 123, the arc may be prevented from spreading outside of the insulating cover 128, in this embodiment.

Figure 8:
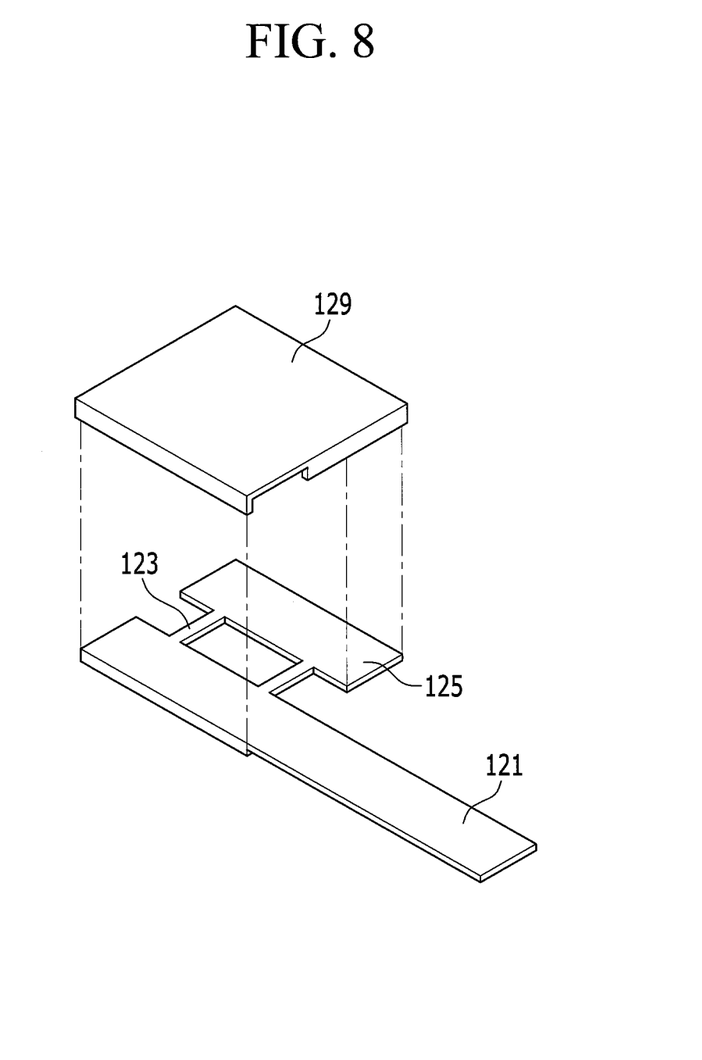
FIG. 8 is an exploded perspective view of a bus bar, a second connection member, and an insulating cover according to a third embodiment of the present invention.

FIG. 8 is an exploded perspective view of a bus bar, a second connection member, and an insulating cover according to a third embodiment of the present invention.

Referring to FIG. 8, since a battery module according to this embodiment has the same structure as the battery module 100 according to the first embodiment, except for an insulating cover 129, a repeated description of the same structure is omitted.

In an embodiment, the insulating cover 129 may cover the second connection member 125, the fuse portion 123, and the short-circuit connection member 121b.

The insulating cover 129, according to this embodiment, may prevent the second connection member 125 and the fuse portion 123 from fracturing, and may prevent the inflow of moisture into the short-circuit opening 37. Further, the insulating cover 129, in this embodiment, may prevent the fuse portion 123 from dissipating heat such that the fuse portion 123 may be more precisely melted at a predetermined temperature. Further, when the fuse portion 123 is melted, according to this embodiment, the insulating cover 129 may prevent an arc and its residues from scattering. Accordingly, even if an arc is generated due to melting of the fuse portion 123, in this embodiment, the arc may be prevented from spreading outside of the insulating cover 129.

Figure 9:
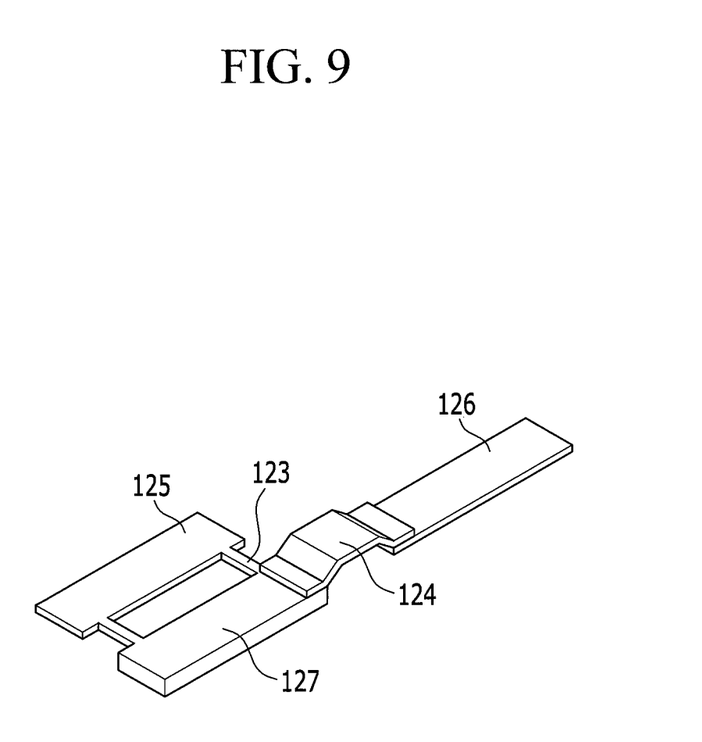
FIG. 9 is a perspective view of a first connection member, a second connection member, and a short-circuit connection member according to a fourth embodiment of the present invention.

FIG. 9 is a perspective view of a first connection member, a second connection member, and a short-circuit connection member according to a fourth embodiment of the present invention.

Referring to the embodiment shown in FIG. 9, the first connection member 126 and the short-circuit connection member 127 that are bonded to the first terminal 21 may be spaced apart along a length of the short-circuit connection member 127.

In an embodiment, the first connection member 126 and the short-circuit connection member 127 may each have an elongated rectangular plate shape.

In an embodiment, the short-circuit connection member 127 may be thicker than the first connection member 126.

In an embodiment, the short-circuit connection member 127 may be between 1.5 to 3 times thicker than the second connection member 125.

In an embodiment, a serial connection member 124 may be coupled to the first connection member 126 and the short-circuit connection member 127.

In an embodiment, the serial connection member 124 may be coupled to a top surface of each of the first connection member 126 and the short-circuit connection member 127, for example, by welding.

While embodiments of this invention have been described in connection with practical embodiments, it is to be understood that the invention is not limited to the disclosed embodiments, but is intended to cover various modifications and equivalent arrangements included within the spirit and scope of the appended claims.

| Description of Symbols | |
|---|---|
| 100: battery module | 101: rechargeable battery |
| 10: electrode assembly | 11: positive electrode |
| 12: negative electrode | 13: separator |
| 11a: positive electrode uncoated region | |
| 12a: negative electrode uncoated region | |
| 21: first terminal | 22: second terminal |
| 25: connecting terminal | 26: case |
| 30: cap assembly | 31: cap plate |
| 32: electrolyte injection opening | 34: vent |
| 37: short-circuit opening | 38: sealing cap |
| 39: vent plate | 39a: notch |
| 41: first current collecting member | |
| 42: second current collecting member | 42a: fuse opening |
| 43: first lower insulating member | 45: second lower insulating member |
| 45a: exhaust opening | 54: upper insulating member |
| 56: short-circuit member | 54a: opening |
| 58: cap connection member | 55, 59: sealing gasket |
| 72: first drawn-out tab | 73: second drawn-out tab |
| 121: bus bar | 121a, 126: first connection member |
| 121b, 127: short-circuit connection member | 121c, 124: serial connection member |
| 122: short-circuit protrusion | 123: fuse portion |
| 125: second connection member | |
| 128, 129: insulating cover | |

What is claimed is:

1. A battery module comprising:
   a plurality of rechargeable batteries, each rechargeable battery comprising a cap plate, a first terminal and a second terminal;
   a bus bar comprising a first connection member and a second connection member, the first connection member being coupled to the bus bar via a serial connection member and a short-circuit connection member, wherein the first connection member, the serial connection member, and the short-circuit connection member are integrally formed in an elongated plate shape, and the second connection member being coupled to the short-circuit connection member via a fuse, wherein the fuse comprises at least two fuses and is spaced from the cap plate, wherein the elongated plate shape and the second connection member are coplanar and the fuses extend between the elongated plate shape and the second connection member; and
   a short-circuit member connected to the first connection member through the serial connection member and connected to the second connection member through the fuse, wherein the short-circuit member is configured to be deformed by increased internal pressure in the respective rechargeable battery to contact the short-circuit connection member.

2. The battery module of claim 1, wherein the short-circuit connection member and the second connection member are coupled to the same rechargeable batteries of the plurality of rechargeable batteries, and the short-circuit connection member and the first connection member are respectively coupled to different rechargeable batteries of the plurality of rechargeable batteries.

3. The battery module of claim 1, wherein each short-circuit connection member is rectangular-shaped, the first connection member being coupled to the short-circuit connection member along a length of the short-circuit connection member, and the second connection member being coupled to the short-circuit connection member along a width of the short-circuit connection member.

4. The battery module of claim 1, wherein each rechargeable battery of the plurality of rechargeable batteries further comprises: an electrode assembly comprising a positive electrode and a negative electrode; a case accommodating the electrode assembly; and a cap assembly coupled to the case, the cap assembly comprising the cap plate, wherein the cap plate and the first terminal are electrically coupled to the positive electrode and the second terminal is electrically coupled to the negative electrode.

5. The battery module of claim 4, wherein the short-circuit connection member further comprises a short-circuit protrusion extending toward the short-circuit member.

6. The battery module of claim 4, wherein the cap plate defines a short-circuit opening through which the short-circuit member is inserted.

7. The battery module of claim 6, wherein the short-circuit connection member is thicker than the second connection member.

8. The battery module of claim 6, wherein the first connection member, the serial connection member, and the short-circuit connection member are arranged in series.

9. The battery module of claim 6, wherein an upper insulating member is between the short-circuit member and the short-circuit connection member, and an opening coupled to the short-circuit opening is defined in the upper insulating member.

10. The battery module of claim 4, wherein the cap plate is plate-shaped, and the second terminal is positioned closer to a center of the cap plate than to the short-circuit member.

11. The battery module of claim 4, wherein the short-circuit member of each rechargeable battery comprises a drawn-out tab at one end of the plurality of rechargeable batteries, the drawn-out tab being coupled to the second connection member at the fuse portion.

12. The battery module of claim 4, wherein each rechargeable battery of the plurality of rechargeable batteries further comprises an insulating cover extending over the second connection member and the fuse portion.

13. The battery module of claim 12, wherein the insulating cover further extends over the short-circuit connection member.

* * * * *